United States Patent [19]
Della Pella

[11] 3,987,947
[45] Oct. 26, 1976

[54] TIRE MOUNTING KIT

[76] Inventor: Joseph A. Della Pella, 1134 Blackberry Terrace, West Sunnyvale, Calif. 94087

[22] Filed: Feb. 27, 1975

[21] Appl. No.: 553,674

[52] U.S. Cl. .................... 224/42.06; 224/42.13; 224/42.2; 224/42.43
[51] Int. Cl.² ........................................ B62D 43/02
[58] Field of Search ....... 224/42.06, 42.04, 42.03 R, 224/42.03 A, 42.03 B, 42.13, 42.2, 42.24, 29 R, 42.45 R, 42.46 R, 42.43; 293/73

[56] References Cited
UNITED STATES PATENTS

| | | | |
|---|---|---|---|
| 1,208,825 | 12/1916 | Pearson | 224/42.2 |
| 1,389,344 | 8/1921 | Di Salvo | 224/42.03 R X |
| 2,620,105 | 12/1952 | Erickson | 224/42.06 |
| 2,711,273 | 6/1955 | Stromberg | 224/42.06 |

Primary Examiner—Robert J. Spar
Assistant Examiner—Jerold M. Forsberg

[57] ABSTRACT

A spare tire mounting kit for installation on the rear of an automobile to provide a tire mount between the vehicle and rear bumper.

5 Claims, 9 Drawing Figures

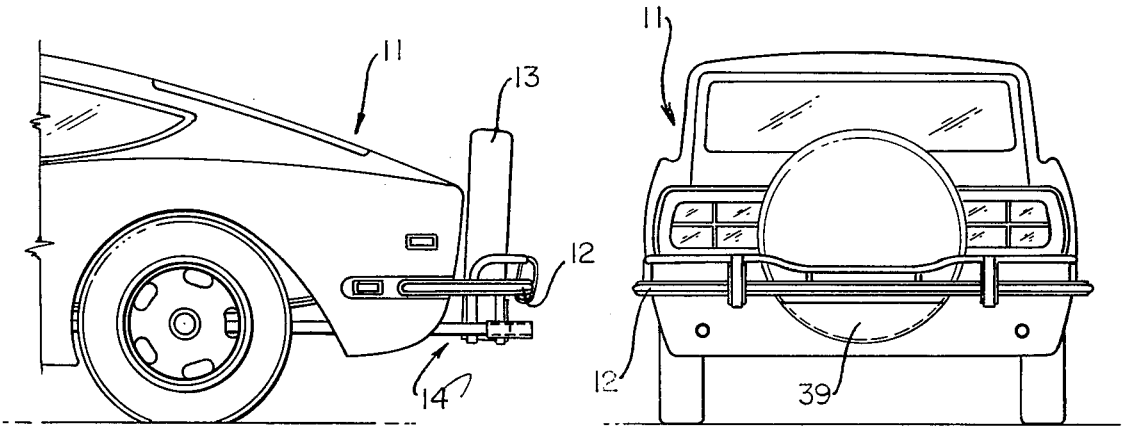
FIG. 1  FIG. 2
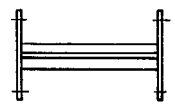 
FIG. 8  FIG. 9
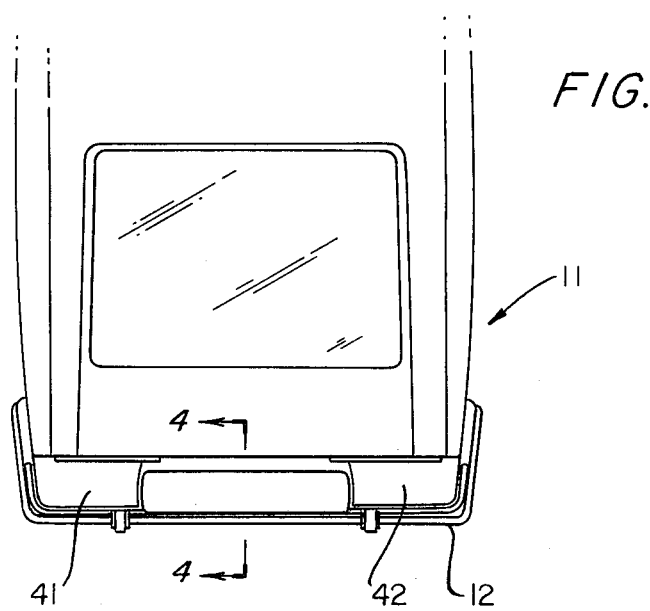
FIG. 3

3,987,947

TIRE MOUNTING KIT

BACKGROUND OF THE INVENTION

This invention relates generally to a spare tire mount and more particularly to a kit to be installed on the rear of a vehicle to provide a tire mount between the vehicle and rear bumper.

In many present day automobiles, especially compact and sports cars, the tire occupies a large portion of the trunk space. One method of increasing the trunk space and still providing a spare tire is to use a spare tire which is normally deflated and which can be inflated by means of a pressurized can when the tire is needed. However, even a deflated tire and rim occupies substantial space.

OBJECTS AND SUMMARY OF INVENTION

It is a general object of the present invention to provide a spare tire mount which is exterior of the trunk.

It is another object of the present invention to provide a kit which can be installed in the rear of a vehicle and provides a tire mount between the vehicle rear and the rear bumper.

It is another object of the present invention to provide a spare tire mount which is easy to install, which is attractive in appearance and which provides additional protection if the vehicle is rear-ended.

The foregoing and other objects of the invention are achieved by a mounting kit which includes a bumper support adapted to be secured to the vehicle and extend rearwardly therefrom and serve to receive the rear bumper and which includes a tire receiving well supported from said support between the rear of the vehicle and the bumper and means for holding the tire in said well.

BRIEF DESCRIPTION OF THE DRAWING

FIG. 1 is a side elevational view of the rear of a vehicle showing the spare tire mounted in a tire mounting kit secured to the rear of the vehicle.

FIG. 2 is a rear elevational view of the vehicle shown in FIG. 1.

FIG. 3 is a plan view of the vehicle portion shown in FIGS. 1 and 2.

FIG. 8 is a plan view of another mounting bracket.

FIG. 9 is an elevational view of the bracket of FIG. 8.

DESCRIPTION OF PREFERRED EMBODIMENTS

Figure 5:
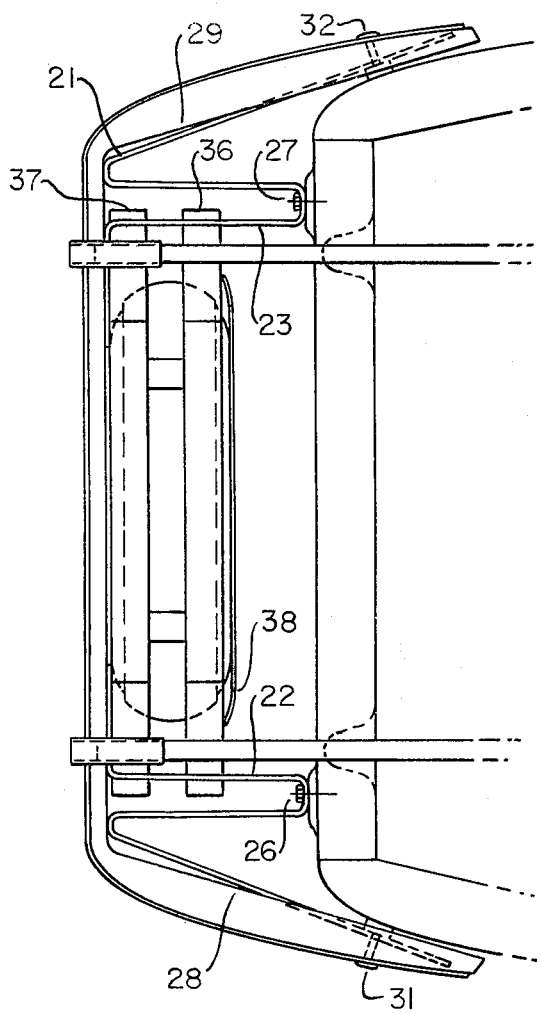
FIG. 5 is a bottom view showing the tire mounting kit.
Figure 6:
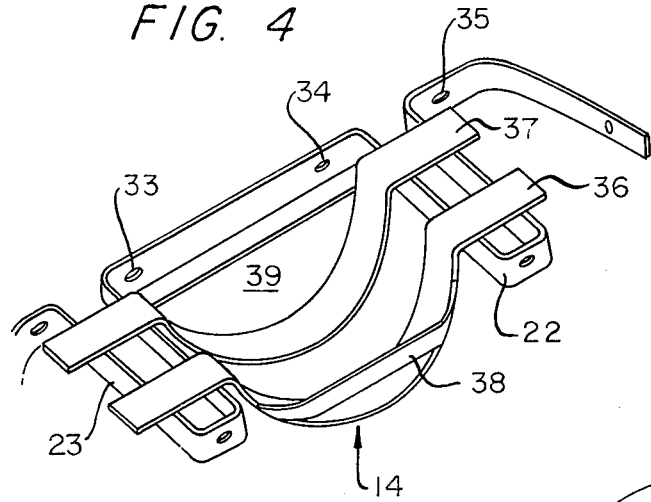
FIG. 6 is a perspective view of a bumper support and tire well in accordance with the invention.
Figure 7:
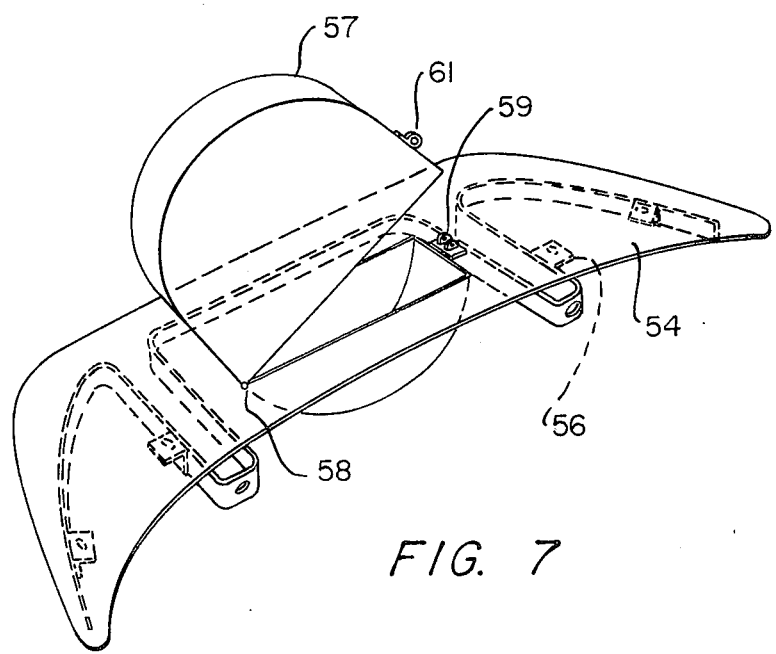
FIG. 7 shows another embodiment of the present invention.

Referring to the figures, there is shown the rear of a vehicle 11 including its conventional rear bumper 12 spaced from the rear of the vehicle to provide space for the spare tire 12. The bottom of the spare tire 13 is adapted to fit into a well 14 to be presently described in more detail. Referring more specifically to FIG. 5 which shows a bottom view of the rear of the vehicle and rear bumper, there is shown a mounting bracket or bumper support 21 which includes U-shaped extending portions 22 and 23 adapted to be secured to the frame of a vehicle as, for example, by bolts 26 and 27. The bumper support includes side portions 28 and 29 which extend forwardly and are adapted to be secured to the side fender of the vehicle where the bumper would normally be secured. The extensions 28 and 29 are shown secured by bolts 31 and 32. The bumper support is more clearly shown in FIG. 6 and it is observed that the bumper support presents a relatively rigid structure. The bumper support is provided with holes 33, 34 and 35 adapted to receive bolts and to hold the bumper on the support. The holes are arranged in the same spacing as the holes in the conventional bumper support whereby the bumper need not be modified.

A pair of spaced parallel straps 36 and 37 define the bottom of the tire well 14. The straps 36 and 37 include a horizontal portion adapted to be welded to the bumper extensions 22 and 23 and downwardly depending curved sections adapted to form a rounded well. A strap 38 is secured to the front edge of the strap 36 to form a forward wall for the well and a plate 39 is suitably secured to the back edge of the strap 37 to form another wall. The rear view of FIG. 3 shows the wall 39. This wall may be used to receive the rear license plate of the vehicle. Deck plates 41 and 42, FIG. 3, are disposed over the extensions 22 and 23 and straps 36 and 37 between the sides of the bumper and the wells to close off the space to provide a pleasing appearance. The decks 41 and 42 may be made of sheet metal or fiberglass and include means for suitably securing the same to the bumper support.

Figure 4:
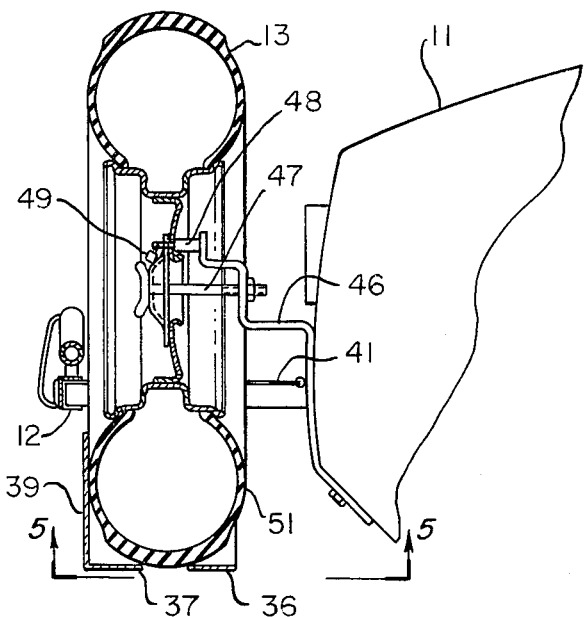
FIG. 4 is a sectional view taken generally along the lines 4—4 of FIG. 3.

The tire is supported in its vertical position by a tire holding bracket 46, FIG. 4, which is secured to the rear of the vehicle and extends upwardly to receive a mounting bolt 47. The upper end of the bracket 46 may include a locking lug 48 which extends through one of the rim bolt holes and is adapted to receive a lock 49 to lock the tire to the vehicle. By tightening the bolt 47, the tire is pivoted counter-clockwise as viewed and the bottom inner portion 51 of the tire abuts against the strap 38 and the tire is securely held in its vertical position within the well. Preferably, the tire is covered such as shown in FIG. 2 to provide a more pleasing appearance.

It is apparent that the tire mounting kit can easily be installed on the rear of a vehicle and provides space for receiving and supporting the tire. The appearance is pleasing in that it provides a rear mounted tire adjacent the rear of the vehicle. Furthermore, the weight added by the kit which may typically be between 100 and 200 pounds provides improved riding quality for the vehicle.

What is claimed is:

1. A kit for mounting a spare tire between the rear of a vehicle having a frame and side fenders and the rear bumper of the vehicle comprising a bumper support having spaced U-shaped extending portions adapted to have the bright portions secured to the vehicle frame and the legs extending rearwardly therefrom and side portions which extend forwardly from the outer ends of the legs and being adapted to be secured to the side fenders, said bumper support including means for receiving and securing the bumper whereby the bumper is supported spaced from the rear of the vehicle, a well supported between said U-shaped portions of said bumper support for receiving and supporting the spare tire, said well being disposed between the rear of the vehicle and the bumper, and means secured to and extending from the rear of the vehicle to engage said spare tire and hold said tire in said well.

2. A kit as in claim 1 including a deck supported by said bumper support and serving to close the space between the rear of the vehicle and said bumper.

3. A kit as in claim 1 in which said well is formed by a pair of spaced straps and means are secured to said straps for defining the front and rear walls.

4. A kit as in claim 2 wherein said deck and well are formed from a single member supported from the bumper support.

5. A kit as in claim 4 which includes a cover hinged to said member and adapted to be locked to the member to form a housing to house and protect the tire.

* * * * *